US010878820B2

(12) United States Patent
Civelli et al.

(10) Patent No.: US 10,878,820 B2
(45) Date of Patent: *Dec. 29, 2020

(54) METHODS AND SYSTEMS FOR DETECTING AND PROCESSING SPEECH SIGNALS

(71) Applicant: Google LLC, Mountain View, CA (US)

(72) Inventors: Jay Pierre Civelli, Sunnyvale, CA (US); Mikhal Shemer, Tel-Aviv (IL); Turaj Zakizadeh Shabestary, Mountain View, CA (US); David Tapuska, Waterloo (CA)

(73) Assignee: Google LLC, Mountain View, CA (US)

(*) Notice: Subject to any disclaimer, the term of this patent is extended or adjusted under 35 U.S.C. 154(b) by 108 days.

This patent is subject to a terminal disclaimer.

(21) Appl. No.: 16/280,642

(22) Filed: Feb. 20, 2019

(65) Prior Publication Data
US 2019/0189128 A1    Jun. 20, 2019

Related U.S. Application Data

(63) Continuation of application No. 15/625,685, filed on Jun. 16, 2017, now Pat. No. 10,255,920, which is a
(Continued)

(51) Int. Cl.
*G10L 21/00* (2013.01)
*G10L 15/30* (2013.01)
(Continued)

(52) U.S. Cl.
CPC ............. *G10L 15/30* (2013.01); *G10L 15/22* (2013.01); *G10L 15/32* (2013.01); *G10L 15/02* (2013.01);
(Continued)

(58) Field of Classification Search
CPC ... G10L 15/22; G10L 2015/088; G10L 15/02; G10L 2015/223; G10L 15/14;
(Continued)

(56) References Cited

U.S. PATENT DOCUMENTS

| 4,363,102 A | 12/1982 | Holmgren et al. |
| 5,659,665 A | 8/1997 | Whelpley, Jr. |

(Continued)

FOREIGN PATENT DOCUMENTS

| WO | 2014/008194 A1 | 1/2014 |
| WO | 2015/025330 A1 | 2/2015 |

OTHER PUBLICATIONS

International Search Report and Written Opinion in International Application No. PCT/US2015/052860, dated Dec. 8, 2015, 12 pages.

(Continued)

*Primary Examiner* — Vijay B Chawan
(74) *Attorney, Agent, or Firm* — Honigman LLP; Brett A. Krueger; Grant Griffith

(57) ABSTRACT

Provided are methods, systems, and apparatuses for detecting, processing, and responding to audio signals, including speech signals, within a designated area or space. A platform for multiple media devices connected via a network is configured to process speech, such as voice commands, detected at the media devices, and respond to the detected speech by causing the media devices to simultaneously perform one or more requested actions. The platform is capable of scoring the quality of a speech request, handling speech requests from multiple end points of the platform using a centralized processing approach, a de-centralized processing approach, or a combination thereof, and also manipulating partial processing of speech requests from multiple end points into a coherent whole when necessary.

20 Claims, 8 Drawing Sheets

Related U.S. Application Data continuation of application No. 15/624,935, filed on Jun. 16, 2017, now Pat. No. 10,163,443, which is a continuation of application No. 15/622,170, filed on Jun. 14, 2017, now Pat. No. 10,249,303, which is a continuation of application No. 15/597,249, filed on May 17, 2017, now Pat. No. 10,163,442, which is a continuation of application No. 15/052,426, filed on Feb. 24, 2016, now Pat. No. 9,779,735.

(51) Int. Cl.
*G10L 15/22* (2006.01)
*G10L 15/32* (2013.01)
G10L 15/02 (2006.01)
G10L 15/08 (2006.01)

(52) U.S. Cl.
CPC .. *G10L 2015/088* (2013.01); *G10L 2015/223* (2013.01)

(58) Field of Classification Search
CPC ....... G10L 15/32; G10L 15/01; G10L 15/063; G10L 15/16; G10L 15/30; G10L 17/22; G10L 15/10; G10L 15/142; G10L 15/18; G10L 15/1815; G10L 15/28; G10L 17/18; G10L 2015/025; G10L 2015/0631; G10L 15/005; G10L 15/26; G10L 15/285; G10L 25/30; G10L 25/51; G10L 25/78; G06F 3/167; G06F 40/264
USPC ..... 704/270, 275, 270.1, 272, 273, 274, 500
See application file for complete search history.

(56) References Cited

U.S. PATENT DOCUMENTS

| | | | |
|---|---|---|---|
| 5,897,616 A | 4/1999 | Kanevsky et al. | |
| 5,983,186 A | 11/1999 | Miyazawa et al. | |
| 6,141,644 A | 10/2000 | Kuhn et al. | |
| 6,567,775 B1 | 5/2003 | Maali et al. | |
| 6,671,672 B1 | 12/2003 | Heck | |
| 6,744,860 B1 | 6/2004 | Schrage | |
| 6,826,159 B1 | 11/2004 | Shaffer et al. | |
| 6,931,375 B1 | 8/2005 | Bossemeyer, Jr. et al. | |
| 6,973,426 B1 | 12/2005 | Schier et al. | |
| 7,016,833 B2 | 3/2006 | Gable et al. | |
| 7,222,072 B2 | 5/2007 | Chang | |
| 7,571,014 B1 | 8/2009 | Lambourne et al. | |
| 7,720,012 B1 | 5/2010 | Borah et al. | |
| 7,904,297 B2 | 3/2011 | Mirkovic et al. | |
| 8,099,288 B2 | 1/2012 | Zhang et al. | |
| 8,194,624 B2 | 6/2012 | Park et al. | |
| 8,200,488 B2 | 6/2012 | Kemp et al. | |
| 8,209,174 B2 | 6/2012 | Al-Telmissani | |
| 8,214,447 B2 | 7/2012 | Deslippe et al. | |
| 8,340,975 B1 | 12/2012 | Rosenberger | |
| 8,588,949 B2 | 11/2013 | Lambourne et al. | |
| 8,670,985 B2 | 3/2014 | Lindahl et al. | |
| 8,713,119 B2 | 4/2014 | Lindahl | |
| 8,717,949 B2 | 5/2014 | Crinon et al. | |
| 8,719,009 B2 | 5/2014 | Baldwin et al. | |
| 8,719,018 B2 | 5/2014 | Dinerstein | |
| 8,768,687 B1 | 7/2014 | Quasthoff et al. | |
| 8,775,191 B1 | 7/2014 | Sharifi et al. | |
| 8,805,890 B2 | 8/2014 | Zhang et al. | |
| 8,838,457 B2 | 9/2014 | Cerra et al. | |
| 8,938,394 B1 | 1/2015 | Faaborg et al. | |
| 8,996,372 B1 | 3/2015 | Secker-Walker et al. | |
| 9,129,602 B1 | 9/2015 | Shepard et al. | |
| 9,142,218 B2 | 9/2015 | Schroeter | |
| 9,202,462 B2 * | 12/2015 | Parada San Martin | G10L 15/063 |
| 9,792,907 B2 * | 10/2017 | Bocklet | G06F 40/284 |
| 9,805,719 B2 * | 10/2017 | Sharifi | G10L 15/22 |
| 9,842,489 B2 * | 12/2017 | Shires | H04L 12/282 |
| 9,842,789 B2 | 12/2017 | Kang et al. | |
| 9,972,320 B2 * | 5/2018 | Melendo Casado | G10L 15/22 |
| 10,163,443 B2 * | 12/2018 | Civelli | G10L 15/30 |
| 10,249,303 B2 * | 4/2019 | Civelli | G10L 15/32 |
| 10,255,920 B2 * | 4/2019 | Civelli | G10L 15/32 |
| 2002/0049596 A1 | 4/2002 | Burchard et al. | |
| 2002/0072905 A1 | 6/2002 | White et al. | |
| 2002/0123890 A1 | 9/2002 | Kopp et al. | |
| 2002/0193991 A1 | 12/2002 | Bennett et al. | |
| 2003/0200090 A1 | 10/2003 | Kawazoe | |
| 2003/0231746 A1 | 12/2003 | Hunter et al. | |
| 2004/0101112 A1 | 5/2004 | Kuo | |
| 2005/0165607 A1 | 7/2005 | Di Fabbrizio et al. | |
| 2006/0074656 A1 | 4/2006 | Mathias et al. | |
| 2006/0085188 A1 | 4/2006 | Goodwin et al. | |
| 2006/0184370 A1 | 8/2006 | Kwak et al. | |
| 2007/0100620 A1 | 5/2007 | Tavares | |
| 2007/0198262 A1 | 8/2007 | Mindlin et al. | |
| 2008/0252595 A1 | 10/2008 | Boillot | |
| 2009/0258333 A1 | 10/2009 | Yu | |
| 2009/0292541 A1 | 11/2009 | Daya et al. | |
| 2010/0070276 A1 | 3/2010 | Wasserblat et al. | |
| 2010/0110834 A1 | 5/2010 | Kim et al. | |
| 2011/0026722 A1 | 2/2011 | Jing et al. | |
| 2011/0054892 A1 | 3/2011 | Jung et al. | |
| 2011/0060587 A1 | 3/2011 | Phillips et al. | |
| 2011/0066429 A1 | 3/2011 | Shperling et al. | |
| 2011/0184730 A1 | 7/2011 | LeBeau et al. | |
| 2011/0304648 A1 | 12/2011 | Kim et al. | |
| 2012/0084087 A1 | 4/2012 | Yang et al. | |
| 2012/0232896 A1 | 9/2012 | Taleb et al. | |
| 2012/0265528 A1 | 10/2012 | Gruber et al. | |
| 2012/0316471 A1 | 12/2012 | Rahman et al. | |
| 2013/0060571 A1 | 3/2013 | Soemo et al. | |
| 2013/0110521 A1 | 5/2013 | Hwang et al. | |
| 2013/0124207 A1 | 5/2013 | Sarin et al. | |
| 2013/0132086 A1 | 5/2013 | Xu et al. | |
| 2013/0183944 A1 | 7/2013 | Mozer et al. | |
| 2014/0012573 A1 | 1/2014 | Hung et al. | |
| 2014/0012578 A1 | 1/2014 | Morioka | |
| 2014/0088961 A1 | 3/2014 | Woodward et al. | |
| 2014/0222430 A1 | 8/2014 | Rao | |
| 2014/0229184 A1 * | 8/2014 | Shires | G10L 15/32 704/275 |
| 2014/0257821 A1 | 9/2014 | Adams et al. | |
| 2014/0278383 A1 | 9/2014 | Fan | |
| 2014/0278435 A1 | 9/2014 | Ganong, III et al. | |
| 2015/0061969 A1 | 3/2015 | Chi et al. | |
| 2015/0095027 A1 * | 4/2015 | Parada San Martin | G10L 15/02 704/232 |
| 2015/0154953 A1 | 6/2015 | Bapat et al. | |
| 2015/0262577 A1 | 9/2015 | Nomura | |
| 2016/0092766 A1 * | 3/2016 | Sainath | G06N 3/0481 706/20 |
| 2016/0104483 A1 | 4/2016 | Foerster et al. | |
| 2016/0260431 A1 | 9/2016 | Newendorp et al. | |
| 2017/0084277 A1 * | 3/2017 | Sharifi | G10L 15/32 |
| 2017/0140756 A1 * | 5/2017 | Sharifi | G10L 15/26 |
| 2017/0148444 A1 * | 5/2017 | Bocklet | G10L 15/22 |
| 2017/0193998 A1 * | 7/2017 | Sharifi | G10L 15/08 |

OTHER PUBLICATIONS

Office Action issued in U.S. Appl. No. 14/675,932 dated Jun. 12, 2015, 9 pages.

Office Action issued in U.S. Appl. No. 14/675,932 dated Oct. 1, 2015, 19 pages.

Notice of Allowance issued in U.S. Appl. No. 14/675,932 dated Jan. 25, 2016, 12 pages.

Office Action issued in U.S. Appl. No. 15/088,477 on May 25, 2016, 12 pages.

Notice of Allowance issued in U.S. Appl. No. 15/088,477 dated Sep. 9, 2016, 17 pages.

Office Action in Korean Application No. 10-2016-7021778, dated Dec. 13, 2016, 4 pages.

(56) References Cited

OTHER PUBLICATIONS

Extended European Search Report issued in Application No. 16195834.3-1910, dated Nov. 23, 2016, 9 pages.
International Preliminary Report on Patentability in International application No. PCT/US2015/030569, dated Jan. 24, 2017, 8 pages.
Office Action issued in U.S. Appl. No. 15/346,914, dated Feb. 3, 2017, 22 pages.
International Search Report and Written Opinion in International Application No. PCT/US2015/052870, dated Dec. 4, 2015, 11 pages.
Office Action in U.S. Appl. No. 15/190,739, dated Aug. 12, 2016, 9 pages.
Office Action in U.S. Appl. No. 15/190,739, dated Feb. 24, 2017, 13 pages.
Office Action in U.S. Appl. No. 14/659,861, dated Dec. 30, 2015, 10 pages.
Notice of Allowance in U.S. Appl. No. 14/659,861, dated Jun. 8, 2016, 8 pages.
Office Action in U.S. Appl. No. 15/052,426, dated Apr. 19, 2017, 8 pages.

\* cited by examiner

METHODS AND SYSTEMS FOR DETECTING AND PROCESSING SPEECH SIGNALS

CROSS-REFERENCE TO RELATED APPLICATIONS

This U.S. patent application is a continuation of, and claims priority under 35 U.S.C. § 120 from, U.S. patent application Ser. No. 15/625,685, filed on Jun. 16, 2017, which is a continuation of U.S. patent application Ser. No. 15/624,935, filed on Jun. 16, 2017, which is a continuation of U.S. patent application Ser. No. 15/622,170, filed on Jun. 14, 2017, which is a continuation of U.S. patent application Ser. No. 15/597,249, filed on May 17, 2017, which is a continuation of U.S. patent application Ser. No. 15/052,426, filed on Feb. 24, 2016. The disclosures of these prior applications are considered part of the disclosure of this application and are hereby incorporated by reference in their entireties.

BACKGROUND

Media data (e.g., audio/video content) is sometimes shared between multiple modules on a network. To get the most out of such media sharing arrangements, it is desirous to have a platform that is capable of processing such media data from the multiple modules simultaneously.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for processing audio signals. More specifically, aspects of the present disclosure relate to detecting and processing speech signals from multiple end points simultaneously.

One embodiment of the present disclosure relates to a method comprising: detecting, at one or more data modules in a group of data modules in communication with one another over a network, an activation command; computing, for each of the one or more data modules, a score for the detected activation command; receiving audio data from each detecting data module having a computed score above a threshold; sending a request to a server in communication with the group of data modules over the network, wherein the request includes the audio data received from each of the detecting data modules having a computed score above the threshold; receiving from the server, in response to the sent request, audio data associated with a requested action; and communicating the requested action to each of the data modules in the group of data modules.

In another embodiment, the method further comprises: combining the audio data received from each of the detecting data modules having a computed score above the threshold; and generating the request to the server based on the combined audio data.

In another embodiment, the method further comprises, in response to detecting the activation command, muting a loudspeaker of each data module in the group.

In yet another embodiment, the method further comprises activating a microphone of each detecting data module having a computed score above the threshold.

In still another embodiment, the method further comprises causing each of the data modules in the group to playout an audible confirmation of the requested action communicated to each of the data modules.

Another embodiment of the present disclosure relates to a system comprising a group of data modules in communication with one another over a network, where each of the data modules is configured to: in response to detecting an activation command, compute a score for the detected activation command; determine whether the computed score for the activation command is higher than a threshold number of computed scores for the activation command received from other detecting data modules in the group; in response to determining that the computed score for the activation command is higher than the threshold number of computed scores received from the other detecting data modules, send audio data recorded by the data module to a server in communication with the group of data modules over the network; receive from the server, in response to the sent audio data, a requested action; determine a confidence level for the requested action received from the server; and perform the requested action based on a determination that the confidence level determined by the data module is higher than confidence levels determined by a threshold number of other data modules that received the requested action from the server.

In another embodiment, each of the data modules in the system is configured to, in response to computing the score for the detected activation command, send the computed score to each of the other data modules in the group.

In another embodiment, each of the data modules in the system is configured to receive, from other detecting data modules in the group, scores for the activation command computed by the other detecting data modules.

In another embodiment, each of the data modules in the system is configured to broadcast the determined confidence level to the other data modules in the group that received the requested action from the server.

In another embodiment, each of the data modules in the system is configured to: compare the confidence level determined by the data module to confidence levels broadcasted by the other data modules in the group that received the requested action from the server; and determine, based on the comparison, that the confidence level determined by the data module is higher than the confidence levels determined by the threshold number of other data modules that received the requested action from the server.

In yet another embodiment, each of the data modules in the system is configured to, in response to determining that the confidence level determined by the data module is higher than the confidence levels determined by the threshold number of other data modules, playout an audible confirmation of the request action received from the server.

In still another embodiment, each of the data modules in the system is configured to compute a score for the detected activation command based on one or more of the following: a power of a signal received at the data module for the activation command; a determined location of a source of the activation command relative to the data module; and whether the detected activation command corresponds to a previously stored activation command.

In one or more other embodiments, the methods and systems described herein may optionally include one or more of the following additional features: the computed score for the activation command detected at a data module is based on one or more of a power of a signal received at the data module for the activation command, a determined location of a source of the activation command relative to the data module, and whether the detected activation command corresponds to a previously stored activation command; the audio data received from each detecting data module having a computed score above the threshold includes speech data captured and recorded by the data module; the speech data captured and recorded by the data module is associated with a speech command generated by a user; the speech data captured by each data module with an activated microphone is associated with a portion of a speech command generated by a user; the audio data recorded by the data module includes speech data recorded by the data module; the speech data recorded by the data module is associated with a speech command generated by a user; the confidence level for the requested action is determined based on an audio quality measurement for the audio data recorded by the data module and sent to the server, and/or the requested action received from the server is based on audio data recorded by a plurality of the other detecting data modules having computed scores higher than the threshold number of computed scores.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
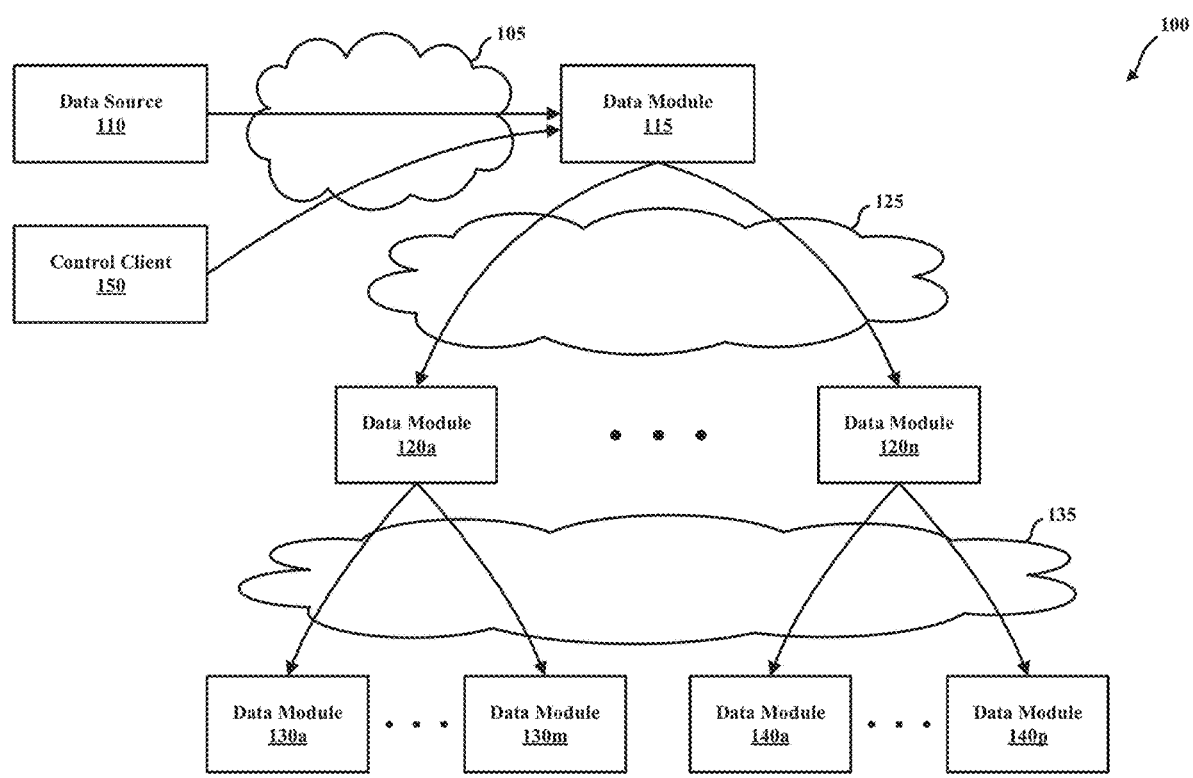
FIG. 1 is a block diagram illustrating an example content management system and surrounding network environment according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Embodiments of the present disclosure relate to methods, systems, and apparatuses for detecting, processing, and responding to audio (e.g., speech) within an area or space (e.g., a room). For example, in accordance with at least one embodiment, a platform for multiple media devices connected via a network may be configured to process speech (e.g., voice commands) detected at the media devices, and respond to the detected speech by causing the media devices to simultaneously perform one or more requested actions.

As will be described in greater detail below, the methods and systems of the present disclosure use a distributive approach for handling voice commands by considering input from multiple end points of the platform. Such end points may be, for example, independent data modules (e.g., media and/or audio devices such as, for example, loudspeakers) connected to one another via a wired or wireless network (e.g., Wi-Fi, Ethernet, etc.).

The methods and systems described herein utilize a flexible architecture in which each data module (e.g., loudspeaker) plays a unique role (e.g., has particular responsibilities, privileges, and/or capabilities) in detecting, processing, and responding to speech commands (e.g., generated by a user). The flexibility of the architecture is partly based on the ability of the data modules to dynamically switch between different roles (e.g., operating roles) while the system is in active operation.

Among numerous other advantages, features, and functionalities that will be described in greater detail herein, the methods and systems of the present disclosure are capable of scoring the quality of a speech request (e.g., voice command, speech command, etc.), handling speech requests from multiple end points using a centralized processing approach, a de-centralized processing approach, or a combination thereof, and also manipulating partial processing of speech requests from multiple end points into a coherent whole when necessary.

For example, in a scenario involving multiple data modules (e.g., loudspeakers), where each data module has a set of microphones (e.g., microphone array), each data module may compute (e.g., determine) a score for audio data (e.g., speech command, activation command, etc.) it records. In the following description, the score computed by a data module may be referred to as a "Hot Word" score for the data module. The computed Hot Word scores may then be used by the system to evaluate which of the data modules received the best signal. In accordance with one or more embodiments, the Hot Word score computed by each of the data modules may be based on, for example, one or more of the following:

(i) Power of the signal. For example, the power of the signal received at the data module for the speech command may be compared to the power of the signal received prior to the speech command.

(ii) Score of a Hot Word recognizer/detector module (which, for example, might be based on or utilize neural network concepts). For example, in accordance with at least one embodiment, the audio data received or recorded at a given data module may be fed to a Hot Word detector, which may be configured to determine whether the audio data corresponds to a known (e.g., stored) Hot Word. For example, the Hot Word detector may utilize a neural network (NN) or a deep neural network (DNN), which takes features of the input audio data and determines (e.g., identifies, assesses, evaluates, etc.) whether there are any occurrences of a Hot Word. If a Hot Word is found to be present in the audio data, then the detector may, for example, set a flag. In accordance with at least one embodiment, the Hot Word detector may be configured to generate a score for any detection of a Hot Word that is made by the detector. The score may, for example, reflect a confidence of the NN or DNN with regard to the detection. For example, the higher the score, the more confident the network is that a Hot Word is present in the audio data. In accordance with one or more embodiments, the output of the DNN may be a likelihood (e.g., probability) of the Hot Word being present in the audio data recorded at the data module. The determined likelihood may be compared to a threshold (e.g., a likelihood threshold, which may be predetermined and/or dynamically adaptable or adjustable based on, for example, network conditions, scores calculated for other nearby data modules, some combination thereof, and the like), and if the determined likelihood is at or above the threshold then a flag may be set to indicate the detection of a Hot Word. The threshold may be set so as to achieve or maintain, for example, a target false-detection versus miss-detection rate. As will be described in greater detail herein, if a Hot Word detection confidence is higher for a particular one of the data modules, it intuitively follows that the module in question will likely have a higher chance of correctly recognizing the command query that follows the detected Hot Word.

(iii) Location of the user relative to the data module. For example, by using a localizer (which, for example, may be part of a beamformer, or may be a standalone module) the angle of the sound source may be obtained. In another example, the angles provided by different data modules may be triangulated to estimate the position of the user (this is based on the assumption that the positions of the data modules are known).

(iv) Additional processing performed on the audio (e.g., combining all microphone array outputs using a beamformer, applying noise suppression/cancellation, gain control, echo suppression/cancellation, etc.)

In accordance with one or more embodiments, the system of the present disclosure may be configured to handle speech requests from multiple end points (e.g., data modules) using a centralized processing approach, a de-centralized processing approach, or an approach based on a combination thereof. For example, in accordance with at least one embodiment, audio data (e.g., speech data) may be collected from all relevant sources (e.g., end points) in the system and the collected audio data sent to one centralized processor (e.g., which may be one of the data modules in a group of data modules, as will be further described below). The centralized processor may determine (e.g., identify, select, etc.), based on scores associated with the audio data received from each of the sources, one or more of the sources that recorded the highest quality audio data (e.g., the processor may determine the sources that have scores higher than the scores associated with a threshold number of other sources). The centralized processor may send the audio data received from the sources having the highest scores to a server (e.g., a server external to the system of data modules) for further processing. The centralized processor may then receive a response from the server and take appropriate action in accordance with the response.

In accordance with at least one other embodiment, each data module in a group of data modules may determine its own Hot Word score and broadcast its score to the other data modules in the group. If a data module in the group determines, based on the broadcasted scores, that the data module has one of the best (e.g., highest quality) signals, then the data module may send/upload its recorded audio data (e.g., speech data relating to a command from the user) to the server (e.g., the Voice Search Back-End, further details of which will be provided below). Upon receiving a response from the server, the data module may then broadcast its confidence level of the response and wait for similar broadcasts from other data modules in the group. If the data module determines that it has one of the highest confidence levels for the response, the data module may act on the response accordingly.

For example, in accordance with at least one embodiment, when a data module detects a Hot Word, the data module generates a score for the detected Hot Word, broadcasts the score to the other data modules in the group (e.g., an Ethernet broadcast), and waits for some period of time (which may be a predetermined period of time, a period of time based on a setting that may or may not be adjustable, or the like) to receive similar broadcasts from other modules. After the designated period of time has passed, the data module has access to the scores generated by all of the other data modules in the group that have also detected the Hot Word. As such, the data module (as well as each of the other detecting data modules in the group) can then determine (e.g., rank) how well it scored with respect to the other detecting data modules. For example, if the data module determines that it has one of the top (e.g., two, three, etc.) scores for the Hot Word, the data module can decide to take action.

The system may also be capable of performing partial processing of speech commands by utilizing portions of audio data received from multiple data modules. For example, in accordance with one or more embodiments, the system may capture each part of a sentence spoken by the user from the "best" loudspeaker for that particular part. Such partial processing may be applicable, for example, when a user speaks a command while moving around within a room. A per-segment-score may be created for each data module and each word processed independently. It should be noted that because the clocks of the data modules in a given group are synchronized, the system is able to compare signal-to-noise ratio (SNR) values between speech segments.

In an example application of the methods and systems of the present disclosure, users are given the ability to play audio content available from an audio source (e.g., audio content stored on a user device, audio content associated with a URL and accessible through the user device, etc.) to any combination of audio devices that share a common wireless or wired network. For example, in the context of a multi-room house, a system of speakers may be located in each room (e.g., living room, dining room, bedroom, etc.) of the house, and the speakers forming a system for a given room may be at various locations throughout the room. In accordance with one or more embodiments described herein, audio will be played out synchronously across all of the audio devices selected by the user. It should be understood, however, that the methods and systems described herein may be applicable to any system that requires time synchronization of any data type between different modules on a network, and thus the scope of the present disclosure is not in any way limited by the example application described above.

FIG. 1 is an example content management system 100 in which one or more embodiments described herein may be implemented. Data Source 110 (e.g., a content source such as an audio source (e.g., an online streaming music or video service, a particular URL, etc.)) may be connected to Data Module 115 over a Network 105 (e.g., any kind of network including, for example, Ethernet, wireless LAN, cellular network, etc.). Content (e.g., audio, video, data, mixed media, etc.) obtained from Data Source 110 may be played out by Data Module 115 and/or transported by Data Module 115 to one or more of Data Modules 120a-120n (where "n" is an arbitrary number) over Network 125 (e.g., a wireless LAN or Ethernet). Similarly, content obtained at Data Modules 120a-120n may be played out by Data Modules 120a-120n and/or transported over Network 135 to corresponding Data Modules 130a-130m, Data Modules 140a-140p, or some combination thereof (where "m" and "p" are both arbitrary numbers). It should also be noted that Networks 125 and 135 may be the same or different networks (e.g., different WLANs within a house, one wireless network and the other a wired network, etc.).

A Control Client 150 may be in communication with Data Module 115 over Network 105. In accordance with at least one embodiment, Control Client 150 may act as a data source (e.g., Data Source 110) by mirroring local data from the Control Client to Data Module 115.

In accordance with one or more embodiments, the data modules (e.g., Data Module 115, Data Modules 120a-120n, and Data Modules 130a-130m) in the content management system 100 may be divided into groups of data modules. Each group of data modules may be divided into one or more systems, which, in turn, may include one or more individual data modules. In accordance with at least one embodiment, group and system configurations may be set by the user.

Data modules within a group may operate in accordance with different roles. For example, data modules within a group may be divided into Player Modules, Follower Modules, and Renderer Modules (sometimes referred to herein simply as "Players," "Followers," and "Renderers," respectively). Example features and functionalities of the Players, Followers, and Renderers will be described in greater detail below. In accordance with at least one embodiment, the methods and systems of the present disclosure allow for multiple configurations and Player/Follower/Renderer combinations, and further allow such configurations and/or combinations to be modified on-the-fly (e.g., adaptable or adjustable by the user and/or system while the system is in operation). As is further described below, the resulting configuration (Player/Follower/Renderer) is determined based on the grouping, audio source/type, network conditions, etc.

The Player acts as "master" or a "leader" of a group of data modules (e.g., Data Module 115 may be the Player in the example group comprising Data Module 115, Data Modules 120a-120n, and Data Modules 130a-130m in the example content management system 100 shown in FIG. 1). For example, the Player may fetch (e.g., retrieve, obtain, etc.) the data (e.g., audio) from the source (e.g., Data Source 110) and forward the data out to the other data modules (e.g., loudspeakers) in the group. The source of the data obtained by the Player may be, for example, an online audio/video streaming service or website, a portable user device (e.g., cellular telephone, smartphone, personal digital assistant, tablet computer, laptop computer, smart television, etc.), a storage device containing memory for storing audio/video data (e.g., a standalone hard drive), and the like. The Player may also be configured to packetize the data obtained from the source and send raw or coded data packets over the network to the data modules in the group. In accordance with at least one embodiment, the Player may be configured to determine whether to send raw or coded data packets to the other data modules in the group based on available bandwidth of the network and/or the capabilities of each particular data module (e.g., each Follower or Renderer's capabilities). For example, it may be the case that one or more devices (e.g., loudspeakers) in the system are not capable of decoding all codecs. Also, in a scenario involving degraded (e.g., limited) network conditions (e.g., low bandwidth), it may be difficult for the Player to send raw data to the other data modules in the group. In such a scenario, the Player may instead send coded data to the other modules. In other instances, the system may be configured to re-encode the data following the initial decoding by the Player. However, it should also be understood that the data originally received by the Player is not necessarily coded in all instances (and thus there may not be an initial decoding performed by the Player).

In addition to the example features and functionalities of the Player described above, in accordance with one or more embodiments of the present disclosure, the Player may also act as a centralized processor in detecting, processing, and responding to speech commands (e.g., generated by a user). For example, as will be described in greater detail below with respect to the example arrangements illustrated in FIGS. 3-7, the Player (or "Group Leader Module") may be configured to receive (e.g., retrieve, collect, or otherwise obtain) "Hot Word" command scores from each of the other data modules in the group, determine the data modules with the highest scores, activate or cause to activate the microphones on the data modules with the highest scores, receive audio data containing a speech command of the user from the data modules with the activated microphones, and combine the received audio data into a request that is sent to an external server for processing (e.g., interpretation). In addition, in response to sending the audio data containing the user's speech command, the Player may receive from the server a response containing a requested action corresponding to the speech command, which the Player may then fan out (e.g., distribute) to the other data modules in the group so that the requested action is performed. In accordance with one or more embodiments described herein, the response received at the Player from the server may also include audio data corresponding to the requested action, which the Player may also fan out to the other data modules in the group. Such audio data may, for example, be played out by each of the data modules in the group as an audible confirmation to the user that the user's command was received and is being acted on.

It should also be understood that a Player may also be a Follower and/or a Renderer, depending on the particulars of the group configuration.

The Follower is the head of a local system of data modules (e.g., Data Modules 120a-120n may be Followers in different systems of data modules made up of certain Data Modules 130a-130m in the example content management system 100 shown in FIG. 1). The Followers may receive data from a Player and fan (e.g., forward) out the data to the connected Renderers in their respective systems. In accordance with one or more embodiments, the Follower may receive over the network raw or coded data packets from the Player and send the data packets to the Renderers in the system. The Follower may send the packets to the Renderers in the same format as the packets are received from the Player, or the Follower may parse the packets and perform various operations (e.g., transcoding, audio processing, etc.) on the received data before re-packeting the data for sending to the connected Renderers. It should be noted that a Follower may also be a Renderer.

In accordance with at least one embodiment of the present disclosure, the Renderer is the endpoint of the data pipeline in the content management system (e.g., Data Modules 130a-130m in the example content management system 100 shown in FIG. 1). For example, the Renderer may be configured to playout the data received from the Follower that heads its respective system. The Renderer may perform additional local processing (e.g., fade in/fade out in the context of audio) on the data received from the Follower prior to playing out the data.

As described above, one or more of the data modules in the content management system may be in communication with and/or receive control commands from a control client connected to the network (e.g., Control Client 150 may be in communication with Data Module 115 over Network 105 in the example content management system 100 shown in FIG. 1). The control client is not a physical data module (e.g., not a physical loudspeaker), but instead may be a device (e.g., cellular telephone, smartphone, personal digital assistant, tablet computer, laptop computer, smart television, etc.) that can control and send messages to the Player. For example, the control client may be used to relay various control messages (e.g., play, pause, stop, volume updates, etc.) to the Player. In accordance with one or more embodiments, the control client may also act as a data source (e.g., Data Source 110) for the content management system, for example, by mirroring local data from the control client to the Player. The control client may use the same communication protocol as the data modules in the content management system.

It should be understood that the platform, architecture, and system of the present disclosure are extremely dynamic. For example, a user of the system and/or the system itself may modify the unique roles of the data modules, the specific data modules targeted for playout, the grouping of data modules, the designation of an "active" group of data modules, or some combination thereof while the system is in active operation.

In accordance with one or more embodiments of the present disclosure, the selection of a group leader (e.g., a Player Module) may be performed using a system in which each data module advertises its capabilities to a common system service, which then determines roles for each of the modules, including the election of the group leader, based on the advertised capabilities. For example, the leader selection process may be based on a unique score computed (e.g., by the common system service) for each of the data modules (e.g., loudspeakers). In accordance with at least one embodiment, this score may be computed based on one or more of the following non-limiting parameters: (i) CPU capabilities; (ii) codec availability (e.g., a select or limited number of codecs may be implemented in particular data modules); and (iii) bandwidth/latency.

Figure 2:
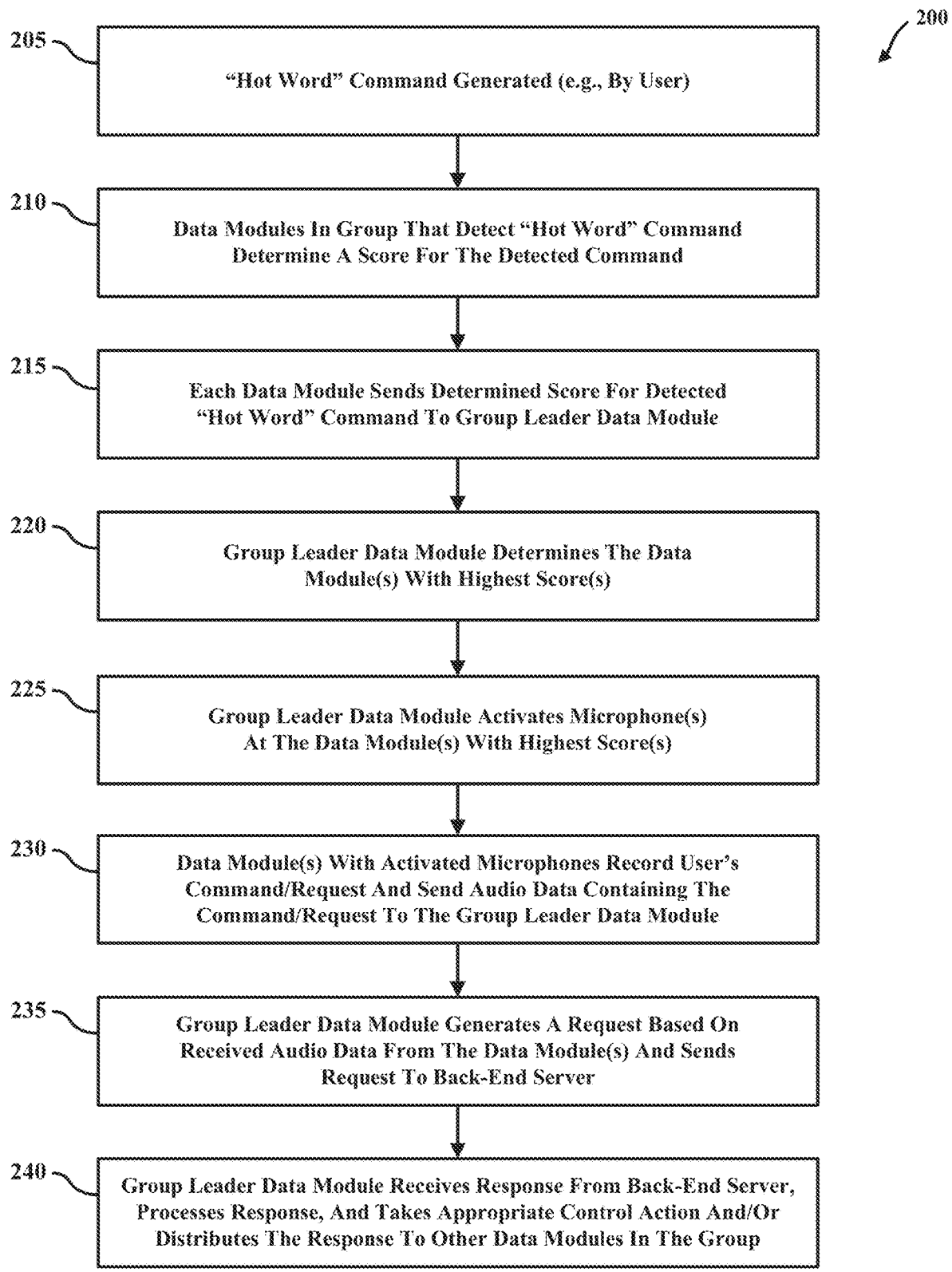
FIG. 2 is a flowchart illustrating an example method for detecting, processing, and responding to speech signals from multiple end points according to one or more embodiments described herein.
Figure 3:
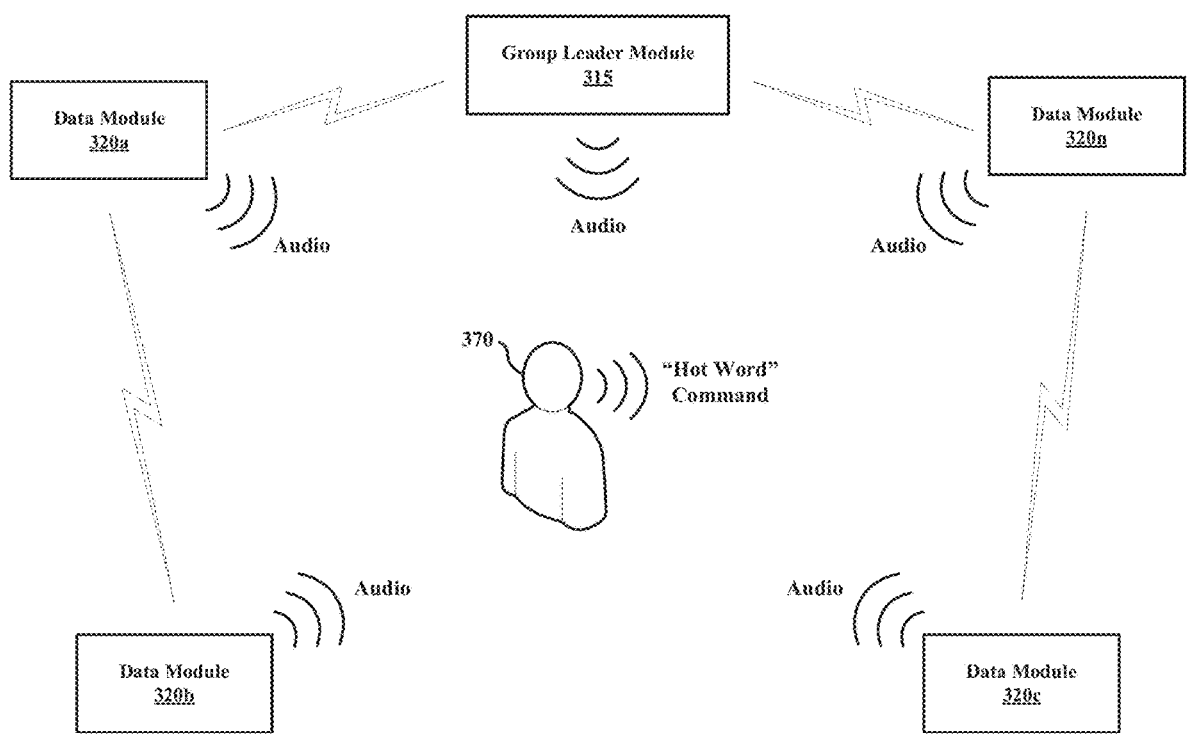
FIG. 3 is a block diagram illustrating example components and data flows for detecting a speech command in a multi-device content management system according to one or more embodiments described herein.
Figure 4:
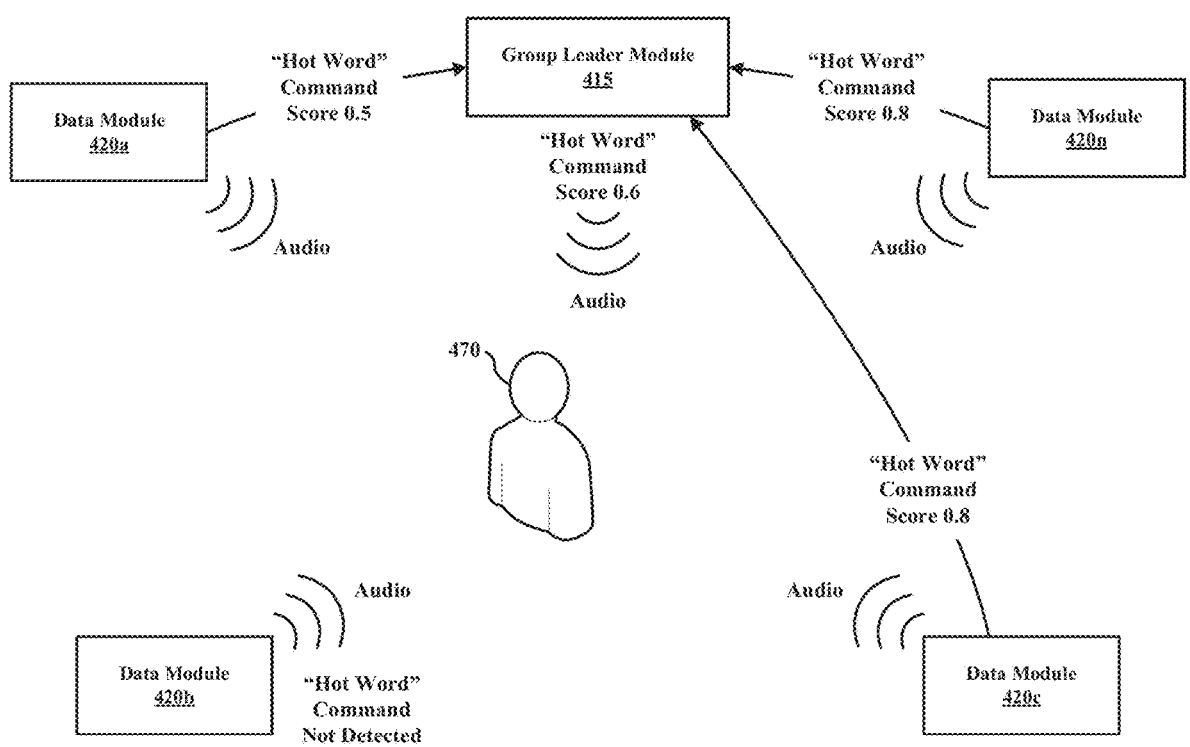
FIG. 4 is a block diagram illustrating example components and data flows for assessing quality of a detected speech command in a multi-device content management system according to one or more embodiments described herein.
Figure 5:
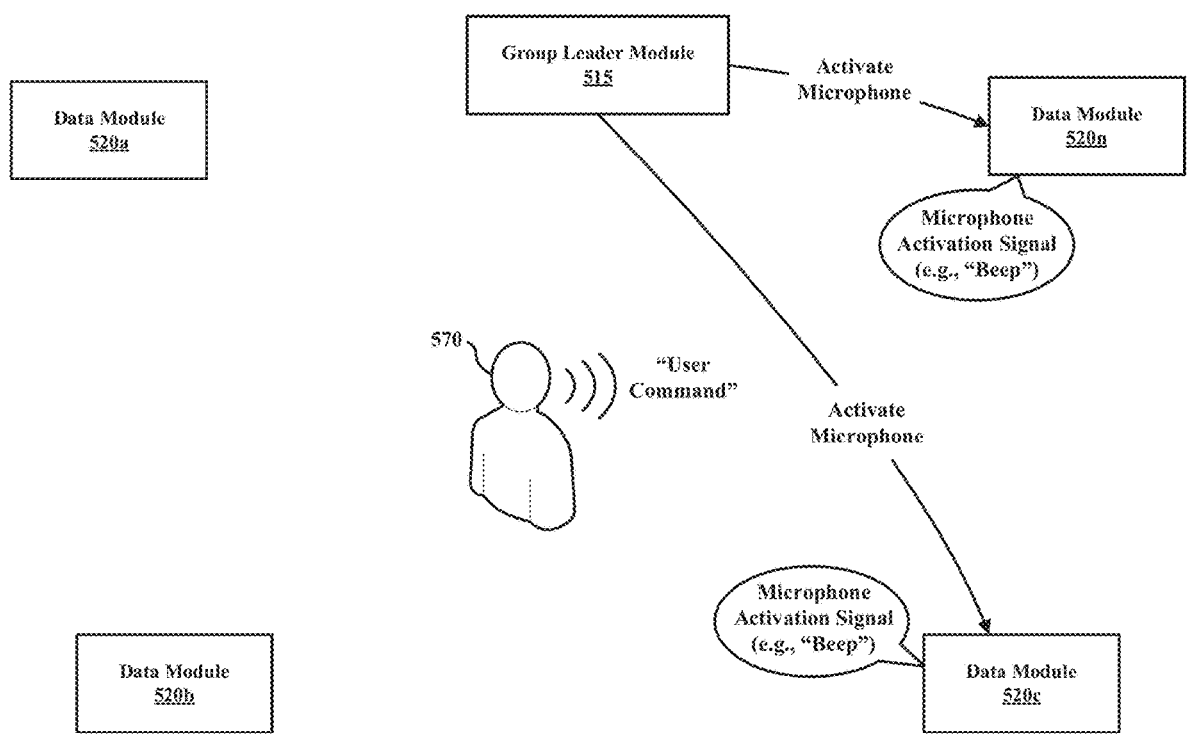
FIG. 5 is a block diagram illustrating example components and data flows for activating a device based on a detected speech command in a multi-device content management system according to one or more embodiments described herein.
Figure 6:
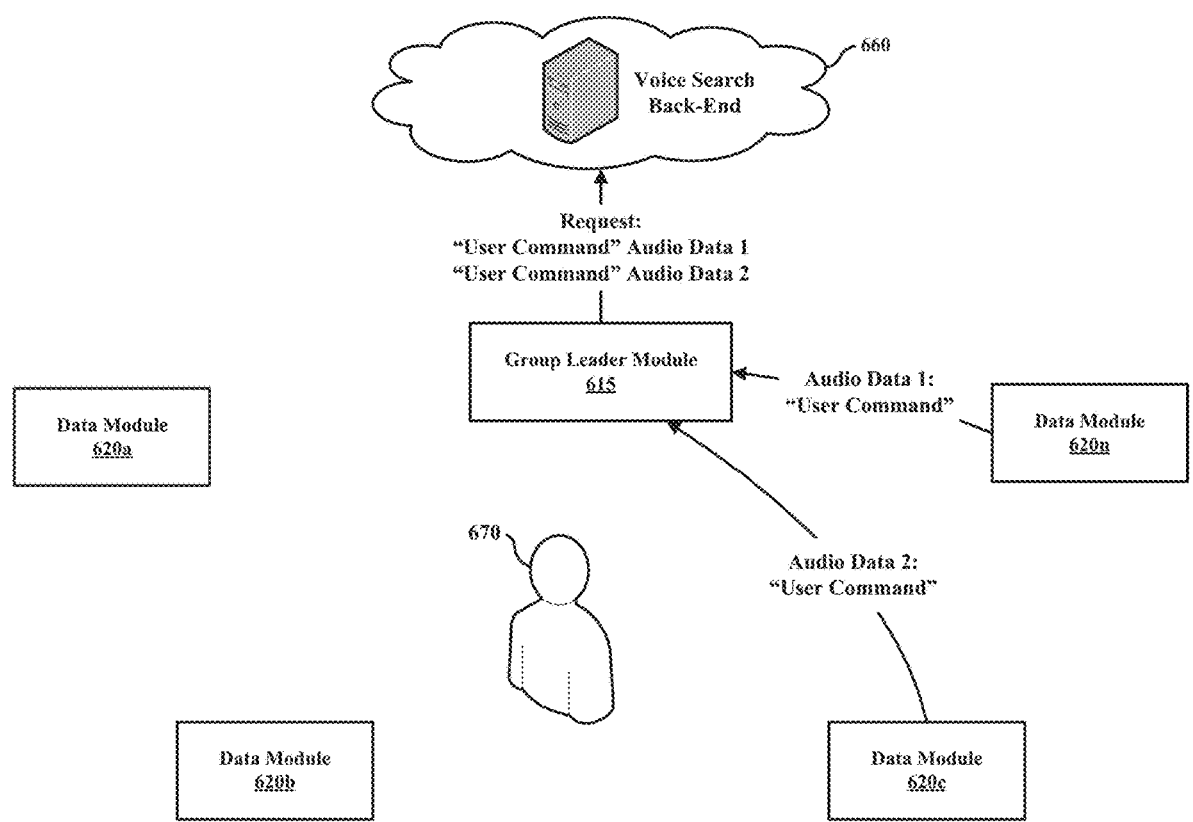
FIG. 6 is a block diagram illustrating example components and data flows for processing a detected speech command in a multi-device content management system according to one or more embodiments described herein.
Figure 7:
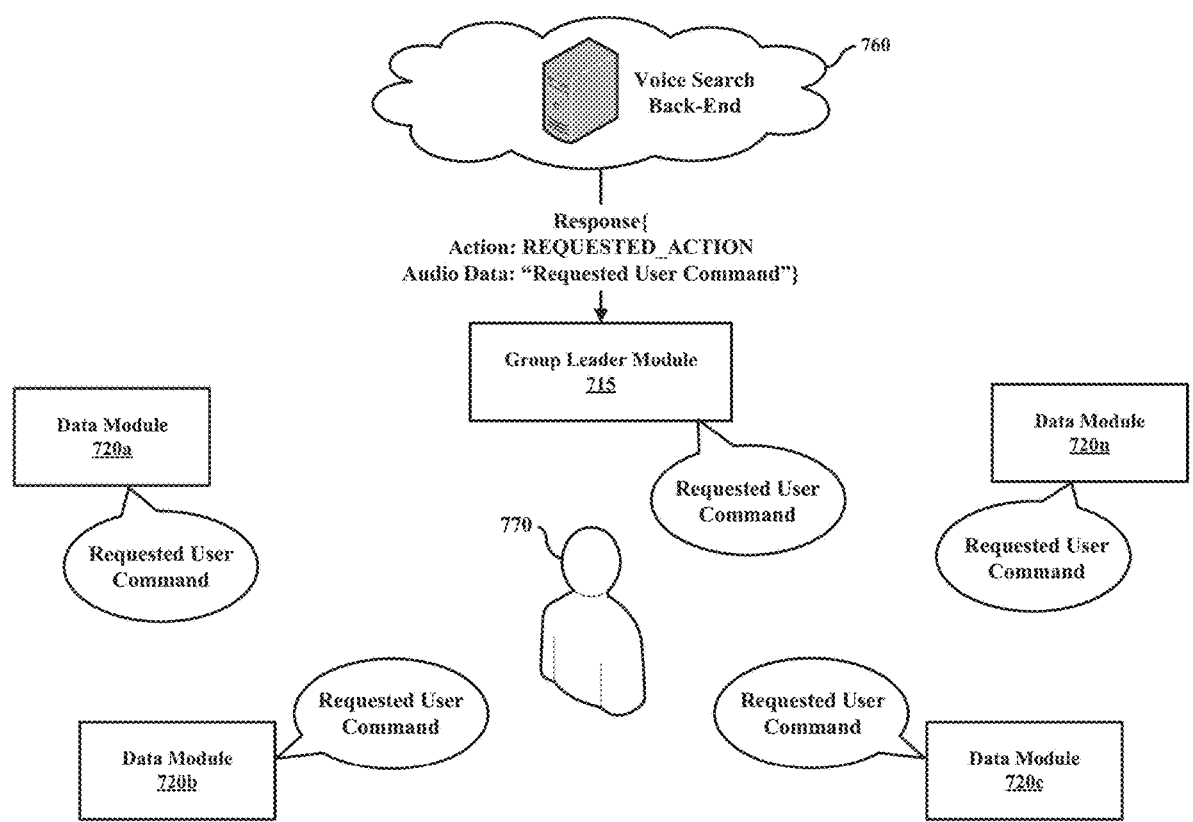
FIG. 7 is a block diagram illustrating example components and data flows for responding to a speech command in a multi-device content management system according to one or more embodiments described herein.

FIG. 2 illustrates an example process 200 for detecting, processing, and responding to speech signals (e.g., speech commands) from multiple end points. In accordance with one or more embodiments described herein, one or more of blocks 205-240 in the example process 200 may be performed by one or more of the components in the example content management system shown in FIG. 1, and described in detail above. For example, one or more of Control Client 150, Data Module 115, Data Modules 120a-120n, and Data Modules 130a-130m in the example content management system 100 may be configured to perform one or more of the operations associated with blocks 205-240 in the example process 200 for detecting, processing, and responding to speech commands, further details of which are provided below.

It should also be noted that, in accordance with one or more embodiments, the example process 200 for detecting, processing, and responding to speech commands may be performed without one or more of blocks 205-240, and/or performed with one or more of blocks 205-240 being combined together.

At block 205, a Hot Word command (which may sometimes be referred to herein as an "activation command," "initialization command," or the like) may be generated (e.g., by a user) during audio playback by data modules in a group of data modules (e.g., a group of data modules comprising Data Module 115, Data Modules 120a-120n, and Data Modules 130a-130m in the example content management system 100 shown in FIG. 1).

At block 210, the data modules in the group that detect the generated Hot Word command (e.g., which may or may not be all of the data modules in the group) may determine (e.g., compute, calculate, etc.) a score for the detected command (a "Hot Word" score). For example, in accordance with at least one embodiment, the Hot Word score that may be determined by each of the data modules may be based on, for example, one or more of the following non-exhaustive and non-limiting factors: (i) power of the signal (e.g., the power of the signal received at the data module for the speech command may be compared to the power of the signal received prior to the speech command); (ii) score of a Hot Word recognizer/detector module (the details of which are described above); (iii) location of the user relative to the data module. For example, by using the localizer of a beamformer, the angle of the sound source may be obtained. In another example, the angles provided by different data modules may be triangulated to estimate the position of the user (this is based on the assumption that the positions of the data modules are known); and (iv) additional processing performed on the audio (e.g., combining all microphone array outputs using a beamformer, applying noise suppression/cancellation, gain control, echo suppression/cancellation, etc.).

At block 215, each of the data modules in the group may send its computed "Hot Word" score to a group leader data module (e.g., a Player Module, as described above). In accordance with one or more embodiments of the present disclosure, the group leader data module may act as a centralized processor of sorts in that the group leader collects (e.g., receives) the computed Hot Word scores from the other data modules in the group.

At block 220, the group leader data module may pause or mute audio playback by the other data modules in the group and determine (e.g., identify), based on the computed Hot Word scores received from the data modules at block 215, those data modules having the highest computed Hot Word scores for the Hot Word command generated at block 205. For example, the group leader data module may utilize the received Hot Word scores (at block 215) to rank or order the data modules in the group according to their corresponding scores. The group leader data module may then determine the data modules that have one of the top (e.g., two, three, etc.) scores for the Hot Word command generated at block 205. In another example, the group leader data module may determine the data modules that have Hot Word scores higher than the scores of some threshold number of the detecting data modules.

At block 225, the group leader data module may activate microphone(s) at the data module(s) in the group determined to have the highest computed scores for the Hot Word command.

At block 230, the data modules with activated microphones (from block 225) may record a generated command/request (e.g., a command/request generated by the user) and send audio data containing the recorded command/request to the group leader data module.

At block 235, the group leader data module may generate a request based on the audio data containing the recorded command/request received from the data modules with activated microphones (at block 230), and send the generated request to an external server for processing (e.g., interpretation). For example, the group leader data module may generate the request sent to the external server by combining the audio data received from the data modules. In addition, in accordance with one or more embodiments, the external server may be a back-end server (e.g., Voice Search Back-End 660 or 760 as shown in the example component and data flows in FIGS. 6 and 7, respectively) that receives the request from the group leader and is configured to interpret the combined audio data (e.g., the audio data containing the recorded command/request from, for example, the user).

At block 240, the group leader data module may receive from the external (e.g., back-end) server a response to the request sent by the group leader data module (e.g., at block 235). The group leader data module may process the received response and take appropriate control action based on the response, and/or the group leader module may distribute (e.g., fan out, transmit, etc.) the response to the other data modules in the group so that the requested action is performed. For example, in accordance with at least one embodiment, the response received at the group leader data module at block 240 may contain a requested action corresponding to the generated command/request (e.g., speech command) recorded by the data modules with activated microphones (at block 230). In another example, the response received at the group leader data module from the server (at block 240) may also include audio data corresponding to the requested action, which the group leader data module may also fan out to the other data modules in the group. Such audio data may, for example, be played out by each of the data modules in the group as an audible confirmation to the user that the user's command was received and is being acted on.

It should be noted that, in accordance with one or more embodiments of the present disclosure, one or more of the operations associated with blocks 205-240 in the example process 200 for detecting, processing, and responding to speech commands may optionally be modified and/or supplemented without loss of any of the functionalities or features described above. For example, each data module in the group of data modules may determine (e.g., calculate, compute, etc.) its own Hot Word score and broadcast its score to the other data modules in the group. If a data module in the group determines, based on the broadcasted scores, that the data module has one of the best (e.g., highest quality) signals, then the data module may send/upload its recorded audio data (e.g., speech data relating to a command from the user) to the external server for processing/interpretation (e.g., to Voice Search Back-End 660 or 760 as shown in the example component and data flows in FIGS. 6 and 7, respectively, further details of which are provided below). Upon receiving a response from the server, the data module may then broadcast its confidence level of the response and wait for similar broadcasts from other data modules in the group. If the data module determines that it has one of the highest confidence levels for the response, the data module may act on the response accordingly (e.g., perform a requested action contained in the response received from the server).

For example, in accordance with at least one embodiment, when a data module detects a Hot Word, the data module may generate a score for the detected Hot Word, broadcast the score to the other data modules in the group (e.g., an Ethernet broadcast), and wait for some period of time (which may be, for example, a predetermined period of time, a period of time based on a setting that may or may not be adjustable, or the like) to receive similar broadcasts from other data modules. After the designated period of time has passed, the data module has access to the scores generated by the other data modules in the group that have also detected the Hot Word. As such, the data module (as well as each of the other detecting data modules in the group) can then determine (e.g., rank) how well it scored with respect to the other detecting data modules. For example, if the data module determines that it has one of the top (e.g., two, three, etc.) scores for the Hot Word, the data module can decide to take action (e.g., send/upload its recorded audio data (e.g., speech data relating to a command from the user) to the external server for processing/interpretation).

It should also be noted that the system of the present disclosure may also be capable of performing partial processing of speech commands by utilizing portions of audio data received from multiple data modules. For example, in accordance with one or more embodiments, the system may capture each part of a sentence spoken by the user from the "best" loudspeaker for that particular part. Such partial processing may be applicable, for example, when a user speaks a command while moving around within a room. A per-segment-score may be created for each data module and each word processed independently. It should be noted that because the clocks of the data modules in a given group are synchronized, the system is able to compare signal-to-noise ratio (SNR) values between speech segments.

FIGS. 3-7 illustrate example components and data flows for various operations that may be performed by the content management system 100 shown in FIG. 1 (and described in detail above). In accordance with one or more embodiments of the present disclosure, a Player data module (or "Group Leader Module") may also act as a centralized processor in detecting, processing, and responding to speech commands (e.g., generated by a user). For example, the Player (e.g., 315, 415, 515, 615, and 715 in the example arrangements shown in FIGS. 3-7, respectively) may be configured to receive "Hot Word" command scores from each of the other data modules in the group (e.g., data modules 320*a*-320*n*, 420*a*-420*n*, 520*a*-520*n*, 620*a*-620*n*, and 720*a*-720*n* in the example arrangements shown in FIGS. 3-7, respectively), determine the data modules with the highest scores, activate or cause to activate the microphones on the data modules with the highest scores, receive audio data containing a speech command of the user (e.g., 370, 470, 570, 670, and 770) from the data modules with the activated microphones, and combine the received audio data into a request that is sent to an external server (e.g., 660 and 760 in FIGS. 6 and 7, respectively) for processing (e.g., interpretation).

In addition, in response to sending the audio data containing the user's speech command, the Player (e.g., 715 in FIG. 7) may receive from the server (760) a response containing a requested action corresponding to the speech command, which the Player may then fan out (e.g., distribute) to the other data modules in the group (720*a*-720*n*) so that the requested action is performed. In accordance with one or more embodiments described herein, the response received at the Player from the server may also include audio data corresponding to the requested action, which the Player may also fan out to the other data modules in the group. Such audio data may, for example, be played out by each of the data modules in the group as an audible confirmation to the user that the user's command was received and is being acted on.

Figure 8:
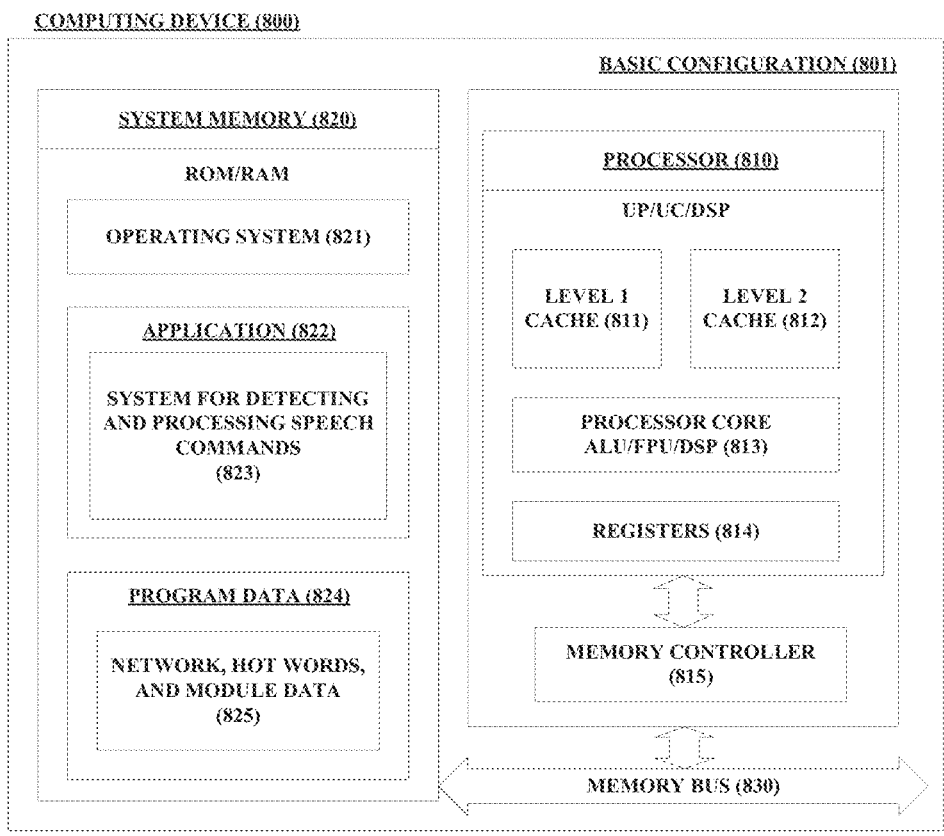
FIG. 8 is a block diagram illustrating an example computing device arranged for detecting and processing speech signals from multiple end points simultaneously according to one or more embodiments described herein.

FIG. 8 is a high-level block diagram of an exemplary computer (800) that is arranged for detecting, processing, and responding to speech commands in a multi-device content management system in accordance with one or more embodiments described herein. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (μP), a microcontroller (μC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (815) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include a system for detecting and processing speech commands (823). In accordance with at least one embodiment of the present disclosure, the system for detecting and processing speech commands (823) is further designed to perform partial processing of speech commands by utilizing portions of audio data received from multiple data modules in a content management system (e.g., Data Module 115, Data Modules 120*a*-120*n*, and/or Data Modules 130*a*-130*m* in the example content management system 100 shown in FIG. 1 and described in detail above).

Program Data (824) may include storing instructions that, when executed by the one or more processing devices, implement a system (823) and method for detecting and processing speech commands using multiple data modules operating on a network. Additionally, in accordance with at least one embodiment, program data (824) may include network, Hot Words, and module data (825), which may relate to various statistics routinely collected from the local network on which the system (823) is operating, certain voice/speech commands that activate scoring an processing operations, as well as one or more characteristics of data modules included in a group of modules. In accordance with at least some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It should also be noted that in situations in which the systems and methods described herein may collect personal information about users, or may make use of personal information, the users may be provided with an opportunity to control whether programs or features associated with the systems and/or methods collect user information (e.g., information about a user's preferences). In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a central processing device from each media device among multiple media devices located in a designated area and in communication with the central processing device, audio data captured by the media device and a corresponding audio quality measurement for the audio data, the audio data corresponding to a voice command spoken by a user in the designated area;
   selecting, by the central processing device from among the multiple media devices, the media device that captured the audio data having a highest corresponding audio quality measurement to playout an audible response associated with the voice command; and
   transmitting, by the central processing device, the audible response for the voice command to the selected media device, the audible response when received by the selected media device causing the selected media device to playout the audible response while the other media devices operate in a low power mode.

2. The method of claim 1, further comprising, after selecting the media device that captured the audio data having the highest corresponding audio quality measurement, transmitting, from the central processing device, an instruction to deactivate microphones on each of the other media devices.

3. The method of claim 1, wherein the corresponding audio quality measurement for the audio data captured by each media device among the multiple media devices is based on an estimated position of the user in relation to the media device.

4. The method of claim 3, wherein the estimated position of the user in relation to the media device is based on an angle of the user relative to the media device.

5. The method of claim 3, wherein the angle of the user relative to the media device is determined using a localizer of a beamformer.

6. The method of claim 1, wherein the corresponding audio quality measurement for the audio data captured by each media device among the multiple media devices is based on a corresponding signal power received at the media device when the audio data was captured.

7. The method of claim 1, wherein the corresponding audio quality measurement for the audio data captured by each media device among the multiple media devices is based on a corresponding hotword confidence score indicating a likelihood that the audio data captured by the media device includes a particular, predefined hotword.

8. The method of claim 7, wherein each media device among the multiple media devices provides the captured audio data to a hotword detector, the hotword detector configured to calculate the corresponding hotword confidence score indicating the likelihood that the audio data captured by the media device includes the particular, predefined hotword.

9. The method of claim 8, wherein the hotword detector utilizes a neural network to calculate the corresponding hotword confidence score.

10. The method of claim 1, wherein each media device among the multiple media devices operates in a low power mode and is configured to exit the low power mode upon detecting a particular hotword has likely been spoken.

11. A central processing device comprising:
    data processing hardware; and
    memory hardware in communication with the data processing hardware and storing instructions that when executed on the data processing device cause the data processing device to perform instructions comprising:
    receiving, from each media device among multiple media devices located in a designated area and in communication with the central processing device, audio data captured by the media device and a corresponding audio quality measurement for the audio data, the audio data corresponding to a voice command spoken by a user in the designated area;

selecting, from among the multiple media devices, the media device that captured the audio data having a highest corresponding audio quality measurement to playout an audible response associated with the voice command; and transmitting the audible response for the voice command to the selected media device, the audible response when received by the selected media device causing the selected media device to playout the audible response while the other media devices operate in a low power mode.

12. The central processing device of claim 11, wherein the operations further comprise, after selecting the media device that captured the audio data having the highest corresponding audio quality measurement, transmitting an instruction to deactivate microphones on each of the other media devices.

13. The central processing device of claim 11, wherein the corresponding audio quality measurement for the audio data captured by each media device among the multiple media devices is based on an estimated position of the user in relation to the media device.

14. The central processing device of claim 13, wherein the estimated position of the user in relation to the media device is based on an angle of the user relative to the media device.

15. The central processing device of claim 13, wherein the angle of the user relative to the media device is determined using a localizer of a beamformer.

16. The central processing device of claim 11, wherein the corresponding audio quality measurement for the audio data captured by each media device among the multiple media devices is based on a corresponding signal power received at the media device when the audio data was captured.

17. The central processing device of claim 11, wherein the corresponding audio quality measurement for the audio data captured by each media device among the multiple media devices is based on a corresponding hotword confidence score indicating a likelihood that the audio data captured by the media device includes a particular, predefined hotword.

18. The central processing device of claim 17, wherein each media device among the multiple media devices provides the captured audio data to a hotword detector, the hotword detector configured to calculate the corresponding hotword confidence score indicating the likelihood that the audio data captured by the media device includes the particular, predefined hotword.

19. The central processing device of claim 18, wherein the hotword detector utilizes a neural network to calculate the corresponding hotword confidence score.

20. The central processing device of claim 11, wherein each media device among the multiple media devices operates in a low power mode and is configured to exit the low power mode upon detecting a particular hotword has likely been spoken.

* * * * *